(12) United States Patent
Huici et al.

(10) Patent No.: US 12,001,326 B2
(45) Date of Patent: Jun. 4, 2024

(54) FAST OPERATING SYSTEM CONFIGURATION OPTION SPACE EXPLORATION VIA CROSS-OS GRAFTING

(71) Applicant: NEC Laboratories Europe GmbH, Heidelberg (DE)

(72) Inventors: Felipe Huici, Heidelberg (DE); Simon Kuenzer, Heidelberg (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 416 days.

(21) Appl. No.: 17/348,891

(22) Filed: Jun. 16, 2021

(65) Prior Publication Data

US 2022/0292013 A1 Sep. 15, 2022

Related U.S. Application Data

(60) Provisional application No. 63/158,388, filed on Mar. 9, 2021.

(51) Int. Cl.
| | | |
|---|---|---|
| *G06F 11/36* | (2006.01) | |
| *G06F 8/41* | (2018.01) | |
| *G06F 9/445* | (2018.01) | |
| *G06F 11/30* | (2006.01) | |
| *G06F 11/34* | (2006.01) | |
| *G06F 16/188* | (2019.01) | |
| *G06F 16/245* | (2019.01) | |

(52) U.S. Cl.
CPC ............ *G06F 11/3688* (2013.01); *G06F 8/41* (2013.01); *G06F 9/44505* (2013.01); *G06F 16/245* (2019.01); *G06F 8/48* (2013.01); *G06F 11/302* (2013.01); *G06F 11/3409* (2013.01); *G06F 16/188* (2019.01); *G06F 2201/865* (2013.01)

(58) Field of Classification Search
CPC ............... G06F 11/302; G06F 11/3409; G06F 11/3688; G06F 16/188; G06F 16/245; G06F 2201/865; G06F 8/41; G06F 8/48; G06F 9/445
See application file for complete search history.

(56) References Cited

U.S. PATENT DOCUMENTS

| | | | |
|---|---|---|---|
| 8,037,453 B1 | 10/2011 | Zawadzki | |
| 8,875,068 B2 | 10/2014 | Killian et al. | |
| 9,645,808 B1 | 5/2017 | Turpie | |
| 9,703,550 B1 | 7/2017 | Mccann et al. | |

(Continued)

OTHER PUBLICATIONS

Jung, Alexander et al., "Kraft," https://github.com/unikraft/kraft, Online, Oct. 21, 2020, pp. 1-3.

(Continued)

*Primary Examiner* — Terrell S Johnson
(74) *Attorney, Agent, or Firm* — Leydig, Voit & Mayer, Ltd.

(57) ABSTRACT

A method searches and tests for performance optima in an operating system (OS) configuration space. The method includes generating a plurality of OS configurations. For at least a first OS configuration, of the generated OS configurations, the method further includes: fetching a plurality of OS modules based on the first OS configuration; building a first OS image from the fetched OS modules; and testing the first OS image to determine a first value of a performance metric.

14 Claims, 11 Drawing Sheets

(56) References Cited

U.S. PATENT DOCUMENTS

| | | | | |
|---|---|---|---|---|
| 10,592,215 | B1* | 3/2020 | Eyberg | G06F 9/455 |
| 2006/0281556 | A1 | 12/2006 | Solomon et al. | |
| 2009/0307676 | A1* | 12/2009 | Price | G06F 9/44521 |
| | | | | 717/162 |
| 2009/0307763 | A1 | 12/2009 | Rawlins et al. | |
| 2011/0296249 | A1* | 12/2011 | Merchant | G06F 11/3428 |
| | | | | 714/E11.062 |
| 2014/0101425 | A1* | 4/2014 | Walters | G06F 9/441 |
| | | | | 713/2 |
| 2019/0205241 | A1 | 7/2019 | Huici et al. | |

OTHER PUBLICATIONS

NEC Laboratories Europe GMBH, "Unikraft," http://www.unikraft.org/, Online, Feb. 16, 2021, pp. 1-5.
Blundell, Nick "Writing a Simple Operating System—from Scratch," School of Computer Science, University of Birmingham, UK, Dec. 2, 2010, pp. 1-77.
Henderson, Tom, "The dream OS," Network World, IDG Communications, Inc., US, Feb. 27, 2006, pp. 1-4.
Novikov, Evgeny and Ilja Zakharov, "Verification of Operating System Monolithic Kernels without Extensions," 8th International Symposium on Leveraging Applications of Formal Methods, Verification, and Validation, vol. 11247, pp. 230-248, Cyprus, Oct. 30-Nov. 13, 2018.
Plutora, "Deployment tools," Plutora, Online, Feb. 28, 2021, pp. 1-10, https://www.plutora.com/ci-cd-tools/deployment-tools.

\* cited by examiner

FAST OPERATING SYSTEM CONFIGURATION OPTION SPACE EXPLORATION VIA CROSS-OS GRAFTING

CROSS-REFERENCE TO RELATED APPLICATION

Priority is claimed to U.S. Provisional Patent Application No. 63/158,388, filed on Mar. 9, 2021, the entire disclosure of which is hereby incorporated by reference herein.

FIELD

Embodiments of the present invention are directed to a system, device, and method for fast operating system configuration option space exploration via cross-OS grafting

BACKGROUND

Extracting the best performance out of mainstream, monolithic operating systems (OS) (e.g., Linux) is paramount to a very large number of businesses. Despite this, doing so remains a black art, where experts in the field tweak, through a haphazard trial-and-error method, different kernel parameters until a certain level of performance (e.g., number of requests per second for a web server) is reached. Such trial-and-error is severely hampered by the very long time it takes to build each resulting OS image (e.g., in the case of Linux, tens of minutes or even hours are not uncommon). The long testing time hinders the ability to perform quick DevOps (software development and information technology operations) cycles, thereby affecting the operational efficiency of systems that undergo frequent updates (e.g., cloud-native infrastructures).

One of the key reasons behind such long build times is that monolithic operating systems (e.g., Linux) have a large set of dependencies between components. Accordingly, modification in one component not only triggers re-compilation of that component, but in dependent components, resulting in long overall build times.

To make matters worse, such operating systems have thousands upon thousands of options (e.g., 16 K+ in the case of Linux), rendering the exploration of such a vast space very challenging.

SUMMARY

According to an embodiment of the present invention, a method is provided that searches and tests for performance optima in an operating system (OS) configuration space. The method includes generating a plurality of OS configurations. For at least a first OS configuration, of the generated OS configurations, the method further includes: fetching a plurality of OS modules based on the first OS configuration; building a first OS image from the fetched OS modules; and testing the first OS image to determine a first value of a performance metric.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide devices, systems, and methods that significantly reduce operating system build times, reducing, in turn, the time it takes to try configuration options, build images resulting from these, and test their performance, with the ultimate goal of efficiently finding performance optima in the large configuration spaces offered by modern monolithic OSes, such as Linux.

For context and by way of non-limiting illustration, an embodiment of a method of the present invention described herein is based on so-called library operating systems, or library OSes for short.

A library OS is made up of components that are modular. That is, it is entirely possible to, without having to modify the code, plug and play the components. A reason behind this is to achieve performance through specialization, constructing images that have the code needed for a particular application to run, but nothing else. For example, a library OS could build an image without a TCP/IP network stack if the target application is an in-memory database that does not need to communicate over the network. A result of this modularity is that library OSes have much fewer dependencies than monolithic ones. And so, for library OSes, rebuilding of a module (e.g., the lwip network stack library) in order to implement a different configuration option (e.g., a different network buffer size) would not trigger rebuilding of other components nor the entire operating system.

Figure 1:
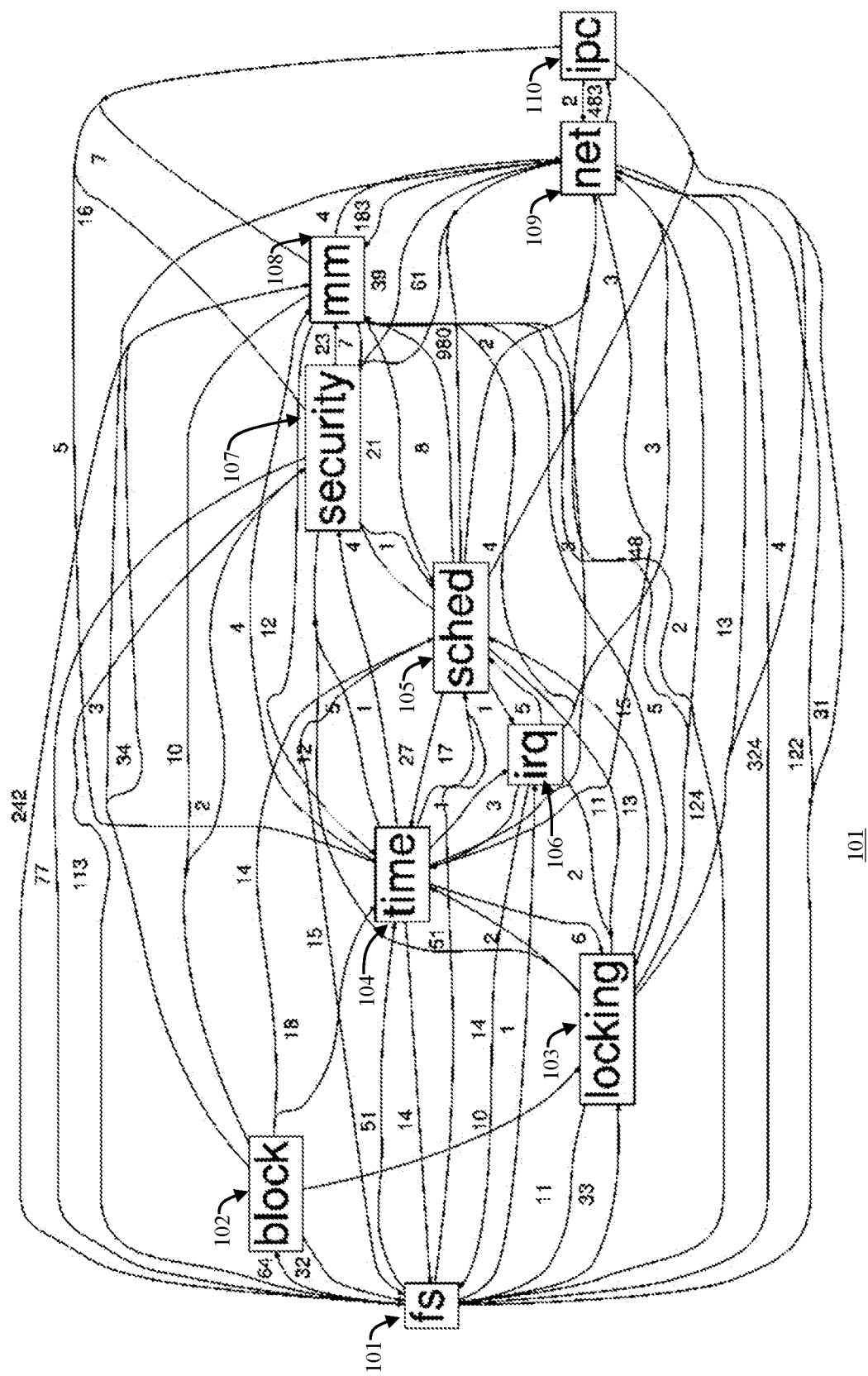
FIG. 1 illustrates exemplary Linux kernel components inter-dependencies.

In contrast to a Library OS, a monolithic OS (such as Linux) is not modular; and therefore, is not as easily configurable. FIG. 1 illustrates an example of a monolithic OS. Namely FIG. 1 illustrates exemplary a graph 100 of Linux kernel components and their inter-dependencies. In particular, FIG. 1 illustrates the following Linux kernel components: File System (fs) 101; Block Devices (block) 102; Locking Systems (lock) 103; Time (time) 104; Scheduler (sched) 105; Interrupt Requests (irq) 106; Security (security) 107; Memory Manager (mm) 108; Networking (net) 109; and Interprocess Communication (ipc) 110. In FIG. 1, the numbers on edges denote multiple dependencies between the kernel components. For example, there are 483 dependencies between the Networking (net) component 109 and the Interposes Communication (ipc) component 110. Accordingly, modification in one component not only triggers re-compilation of that component, but in dependent components, resulting in long overall build times.

For DevOps in cloud-native systems, it is important to test the impact of different configurations on the achieved system performance. However, this is difficult because operating systems (e.g., Linux) have a huge number of configuration options that may affect performance, and testing each configuration is time consuming. Accordingly, there is a need for a solution to provide more efficient (time, cost, and processing) testing of how changes to configurations impact system performance.

In view of the above, embodiments of the present invention provide an AIOps (artificial intelligence operations) mechanism to automate configuration testing and to significantly reduce the time to explore the performance results of different configurations.

An embodiment of the present invention uses (1) library OSes (also known as unikernels); and (2) cross-OS grafting, building the target configuration option(s) on a different, much smaller OS to see the configurations affect performance or not.

In an exemplary embodiment of the present invention, a method is provided for accelerating the search for performance optima in an operating system configuration option space. The method includes one or more of the following operations:

1) pre-building the entire set of modules belonging to a library operating system, followed by the use of an experiment configuration file and an experiment permutation configurator to generate a set of configuration option specifications that will be used by a library OS build tool to build a final image;
2) fetching and compiling, by the library OS build tool, of the module or modules whose configuration options are specified in the configuration file;
3) linking of these modules with the appropriate pre-built modules in order to generate a final image,
   a. an alternate step that can graft a monolithic OS component by compiling it out-of-tree using the library OS build tool, and by linking it with the appropriate pre-built modules in order to generate a final image;
4) running the obtained software image(s) and measuring their performance for a given metric (e.g., requests per second for a web server); and/or
5) outputting the value of the measurement (e.g., 100 K requests per second), which can be used to automatically decide whether the combination of configuration options used to build the current images boosted the performance or not.

An embodiment of the present invention comprises a system that is configured to:
1) use library operating systems to build of several operating systems configurations for performance testing, including:
   a. pre-building a large set of modules whose configuration options are not needed for the performance search, while recompiling only those modules whose configuration options change;
2) map the configuration of a library operating system to the configuration of a monolithic operating system, including:
   a. performing an out-of-tree building of a component of a monolithic operating system inside a library operating system, and grafting it with the rest of the pre-built modules of the library operating system, and
   b. using a mapping function between the configuration of a library OS module and the corresponding OS configuration; and
3) prioritize the performance test to run storing past test results and using a Configuration Indexing Function that groups test configurations according to their similarity According to another exemplary embodiment of the present invention, a method is provided that searches and tests for performance optima in an operating system (OS) configuration space. The method includes generating a plurality of OS configurations. For at least a first OS configuration, of the generated OS configurations, the method further includes: fetching a plurality of OS modules based on the first OS configuration; building a first OS image from the fetched OS modules; and testing the first OS image to determine a first value of a performance metric.

The testing of the first OS image may include: running the first OS image, and measuring the first value of the performance metric. The first value of the performance metric associated with the first OS image may then be output by the method.

For each of one or more additional OS configurations of the OS configurations, respectively, the method may further include: fetching a respective further plurality of OS modules based on a respective one of the additional OS configurations; building a respective further OS image based on the respective further plurality of OS modules; and testing the respective further OS image to determine a respective further value of the performance metric.

The method may further include: comparing the first value of the performance metric associated with the first OS image with the respective further value of the performance metric of the respective further OS image associated with each of the one or more additional OS configurations to determine a highest value of the performance metric; and identifying as a selected OS configuration one of the OS configurations from among the first configuration and the one or more additional OS configurations that is associated with the highest value of the performance metric.

The selected OS configuration may be in a library OS space. The method may further convert the selected OS configuration to a non-library OS space.

An experiment configuration file may be received during the operation of the method. The plurality of OS configurations may then be generated based on the configuration file.

The generating the plurality of OS configurations may include: generating the first OS configuration according to the experiment configuration file, and generating further ones of the OS configurations as permutations of the first OS configuration.

Generating the plurality of OS configurations may include: generating a unique hash based on the experiment OS configuration; and determining, from an experiment OS configuration database, a cluster of OS configurations based on calculating a joint similarity among the unique hash and hashes associated with other OS configurations in the experiment OS configuration database.

The experiment OS configuration database may include performance indicators associated with the hashes. The method may prioritize the OS configurations in a queue according to the performance indicators.

The plurality of OS modules may be fetched only from a pool of precompiled modules of a library OS.

At least one of the plurality of OS modules may be fetched from a pool of precompiled modules of a library OS, and at least another one of the plurality of OS modules may be fetched by parametrizing and compiling an uncompiled module of the library OS based on the first OS configuration.

At least one of the plurality of OS modules may be fetched from a pool of precompiled modules of a library OS, and at least another one of the plurality of OS modules may fetched and compiled from a non-library OS.

The method may further include: receiving an experiment OS configuration file comprising target OS configurations in a target OS space; converting the target OS configurations in the target OS space to library OS configurations in a library OS space; and generating an experiment configuration file based on the library OS configurations. The plurality of OS configurations are generated based on the experiment configuration file.

According to another exemplary embodiment of the present invention, a system is provided that has one or more processors which, alone or in combination, are configured to provide for execution of a method that searches and tests for performance optima in an operating system (OS) configuration space. The method executed by the system may include: generating a plurality of OS configurations; and for a first OS configuration of the OS configurations: fetching a plurality of OS modules based on the first OS configuration; building a first OS image from the fetched OS modules; and testing the first OS image to determine a first value of a performance metric. Other aspects of system embodiments according to the present invention may implement features of one or more aspects of the method embodiments discussed herein.

According to another exemplary embodiment, a tangible, non-transitory computer-readable medium is provided that has instructions thereon which, upon being executed by one or more processors, alone or in combination, provide for execution of a method that searches and tests for performance optima in an operating system (OS) configuration space. The instructions may provide for the execution of the method that includes: generating a plurality of OS configurations; and for a first OS configuration of the OS configurations: fetching a plurality of OS modules based on the first OS configuration; building a first OS image from the fetched OS modules; and testing the first OS image to determine a first value of a performance metric. Other aspects of computer-readable medium embodiments according to the present invention may implement features of one or more aspects of the method embodiments discussed herein.

Embodiments of the present invention, as explained above and below, provide improvements over the current state of the art, which relies on using a build tool of a monolithic OS (e.g., Linux's kConfig/make files) to build an image to run for each combination of configuration options. Because this step can take in the order of tens of minutes or hours, exploring a large configuration option space to find performance optima is extremely time consuming and inefficient. This usually limits the testing of configurations to a few options, or relies on expert knowledge that is hard to obtain. In contrast, embodiments of the present invention severely reduces the time it takes to build such images, and thus results in a much faster search (e.g., a reduction to a matter of minutes or under a minute versus the hours or tens of minutes needed when using the state of the art approach), without requiring past experience on the matter.

Embodiments of the present invention may be deployed for cloud-native applications (e.g., for 5G) which have many microservices, each one with their own configuration properties, and running on heterogeneous hardware. A user could be asked to provide a mapping function for their OS/application configurations, or to setup the grafting method.

According to a preferred embodiment, an AIOps mechanism of the present invention may be provided as an automated method that can be divided into three stages, as described below in connection with FIGS. 2-4.

Figure 2:
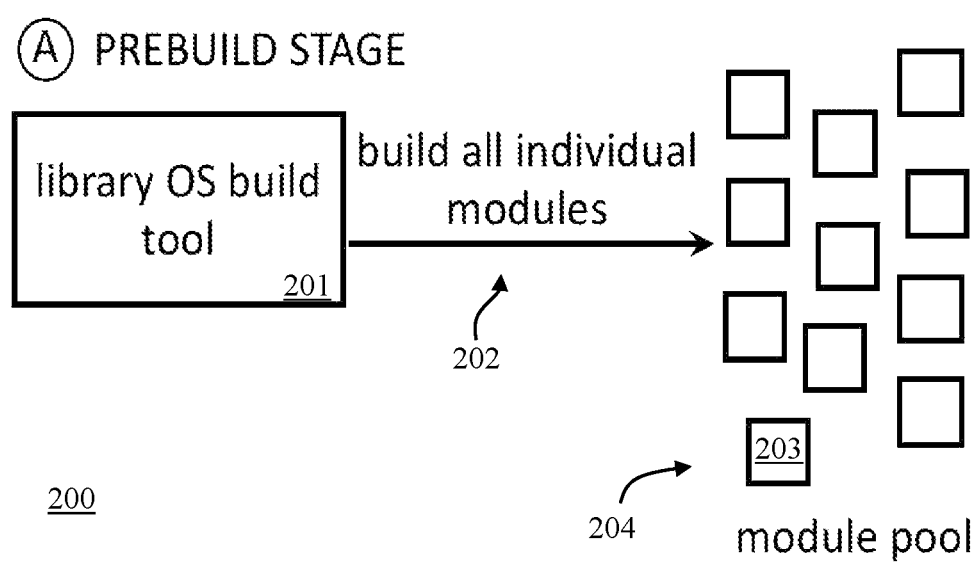
FIG. 2 illustrates a first stage of an embodiment of the present invention.

FIG. 2 illustrates an embodiment of a first stage of a method according to the present invention. In particular, FIG. 2 illustrates a "Stage A" or "pre-build" stage 200 where all modules of a library OS are compiled into a module pool ready to be linked into a final image.

The first stage (i.e., "Stage A" or "pre-build") may be done only once. In the first stage, the build tool 201 of the operating system—see e.g., github.com/unikraft/kraft, in the case of the Unikraft library OS; see also unikraft.org, the entire contents of each of which are hereby incorporated by reference herein—compiles all of the modules so that they are ready to be linked into a final image at a later stage. A build tool, as the term is used in the art, is a program (or set of programs) that compiles (and fetches, if necessary) and links (or other compilation operation) source code into a binary or other computer-executable program. Embodiments of the present invention may use one of a number of state of the art build tools as the build tool for building the operating system.

In other words, in the prebuild stage 200, the library OS build tool 201 executes a compile operation 202 to build all individual modules 203 of the library OS, providing a module pool 204. According to an embodiment, the compile operation 202 may be executed using a predefined configuration file that is configured to provide a plurality of modules. The predefined configuration file may provide modules associated with a previously known OS image that is to be improved upon.

Figure 3:
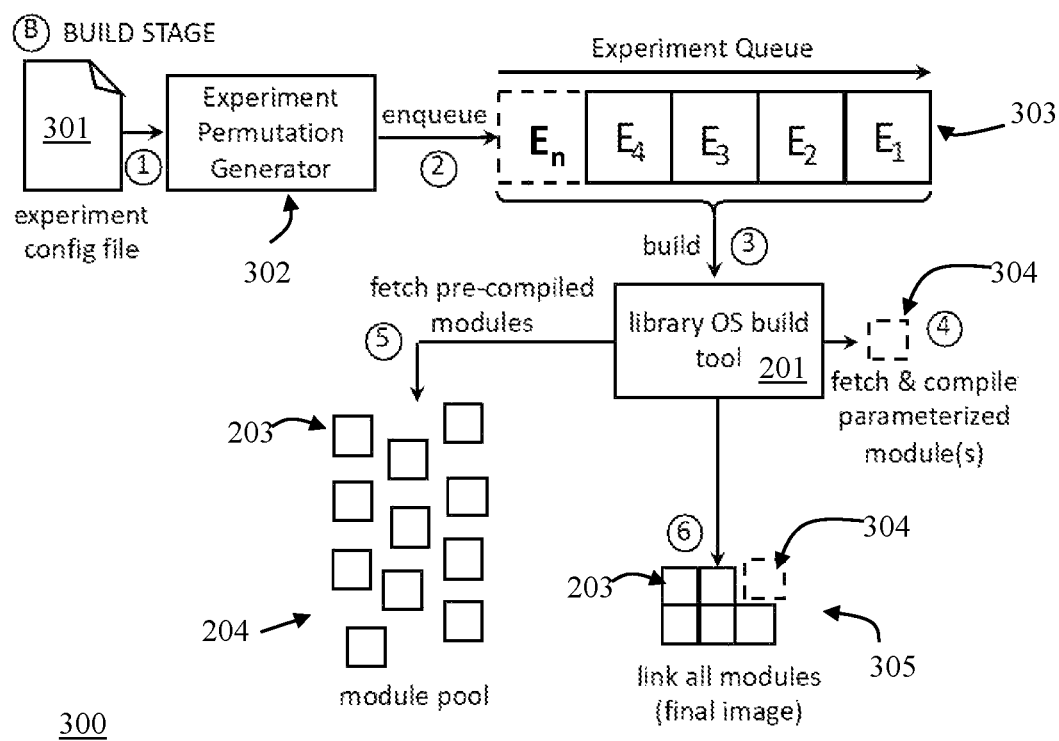
FIG. 3 illustrates a second stage of an embodiment of the present invention.

FIG. 3 illustrates an embodiment of a second stage of a method according to the present invention. In particular, FIG. 3 illustrates a "Stage B" or "build stage" 300 where a set of experiments varying OS configuration options are used to build different images into order to test their performance.

In the second stage, the build stage (or "Stage B") 300, an experiment configuration file 301 is used to specify the parameters and values that should be explored in order to attempt to find a performance optimum. The experiment configuration file 301 may, according to some embodiments, specify system parameters and configurations, such as whether a network stack should use memory pools or what the number of concurrent TCP connections should be. Of course, many other configurations may be specified in the experiment configuration file 301 according to the aspects of the application.

According to an embodiment, the experiment configuration file may be prepared by a human operator or generated by a configuration program. Particular parameters—and their potential values/ranges—may be selected by the operator (or adjusted by a program) according to an expected or predicted influence on the performance of the target application (e.g., network settings for a web server).

As shown in FIG. 3, the build stage 300 includes that an experiment permutation generator 302 receives/retrieves (Step 1) information from the experiment configuration file 301. The permutation generator 302 then generates (Step 2) a set of "experiments" $E_1, E_2, E_3, E_4, \ldots, E_n$, each specifying the full set of specific configuration options (e.g., memory pools on, 10 concurrent TCP connections) required to build an actual OS image. The permutation generator 302 may sequentially generate the set of experiments $E_1, E_2, E_3, E_4, \ldots, E_n$ as an experiment queue 303.

In an embodiment, the permutation generator may use a brute force or a grid search, where all parameters of the configuration are searched. In embodiments, the permutation generator may use clustering, as described below.

Then, the library OS build tool 201 uses this full set to begin building the image (Step 3). First, the library OS build tool 201 fetches and compiles any parametrized modules 304 (in the running example, the network stack) (Step 4). Second, the library OS build tool 201 fetches all the applicable pre-compiled modules 203 (e.g., a memory allocator and scheduler) from the module pool (Step 5). Third, the library OS build tool 201 links both the fetched pre-compiled modules 203 and the parametrized modules 304 into a final image 305 (Step 6). Steps 4 and 5 of Stage B may be performed out of the order described above.

The parameterized modules may be built from the same OS library as used in Stage A, but are configured and compiled according to the specific configurations of the experiments. According to an embodiment, the build tool will use a particular pre-compiled module unless the configuration of the experiment (generated by the experiment permutation generator) indicates that a particular module requires specific parameters (differing from the pre-configured module's parameters).

Because the operating system is libraryized/modular, and because most modules were pre-built in Stage A, deriving a new final image 305 with the specified configuration options is fast and requires very little compilation work: only the modules to which the configuration options directly apply require recompilation; the linking (in Step 6 of Stage B above) is a much quicker process (e.g., at least an order of magnitude) than compilation.

Figure 4:
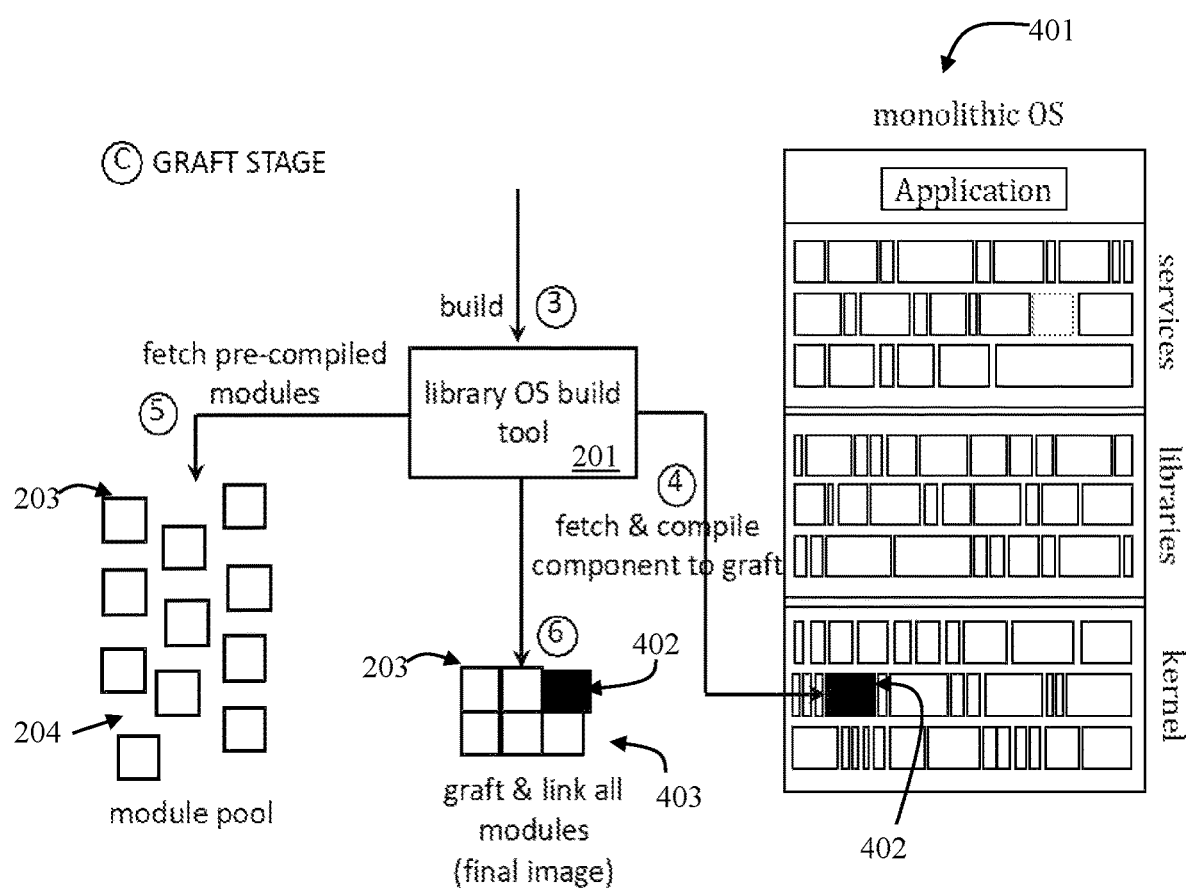
FIG. 4 illustrates a third stage of an embodiment of the present invention.

FIG. 4 illustrates a third stage 400 of the method according to an embodiment of the present invention. The third stage, or "Stage C" is a "graft stage."

In the third stage (i.e., "Stage C" or "graft stage") 400 the testing of a component of a monolithic operating system 401 is targeted. To do so, most of the steps in Stage B previously described are repeated, except that Step 4 of Stage C is different.

In Step 4 of Stage C, the library build OS build tool 201, fetches a module 402 from the monolithic kernel 401— instead of using one of the available modules (e.g., the precompiled modules from Stage A), and compiles outside of the monolithic kernel 401, by grafting onto the library operating system (grafting corresponds to linking a module from an external operating system into a target operating system). For instance, this could be done to run quickly through a potentially large set of configuration options of a memory allocator in order to derive high performance.

In an embodiment, the library build OS build tool 201 determines which module to fetch according to the parameters in the current configuration file, the module is also configured and compiled according to the configuration file. A parameter of the configuration file may have a direct mapping to a module, identifying the particular module to fetch (e.g., a parameter identifying a maximum number of active TCP connections would correspond to the network stack module).

With this in place, the library OS build tool 201 then links/grafts (Step 6) the compiled module 402 with the appropriate, pre-compiled modules 203 of the library OS. In this way, this method allows for testing a monolithic OS' component very quickly, without having to go through expensive, time consuming recompilation cycles that would result from using the monolithic OS' normal build process.

A recompilation cycle, as the term is used in the normal monolithic OS build process, occurs when a module is changed. The creation of this changed module causes any other modules that use the changed module (along with additional modules that use those other modules, etc.) to be recompiled, creating a potentially large recompilation chain. In a library OS, these dependencies are significantly fewer (as compared to monolithic OSs) because the library OS modules are largely independent. Thus only the module whose parameters have changed for a particular experiment is recompiled, and not a chain of other modules.

The result of the link/grafting of the compiled module 402 from the monolithic kernel 401 together with the pre-compiled modules 203 from the module pool 204 is a grafted final OS image 403.

The library OS build tool 11 determines which modules (pre-compiled and custom compiled) based on the configuration file and a set of rules (e.g., a config file) for a particular application in a library OS. The set of rules states which modules are used, and from the configuration file it can be determined which pre-compiled modules can be used and which modules are custom configured and compiled.

While one embodiment of an AIOps mechanism, implemented as a three stage method, has been discussed above in connection with FIGS. 2-4, other embodiments are contemplated by the present disclosure. For example, other embodiments of the present includes modifications to the Stages A, B and/or C.

Figure 5:
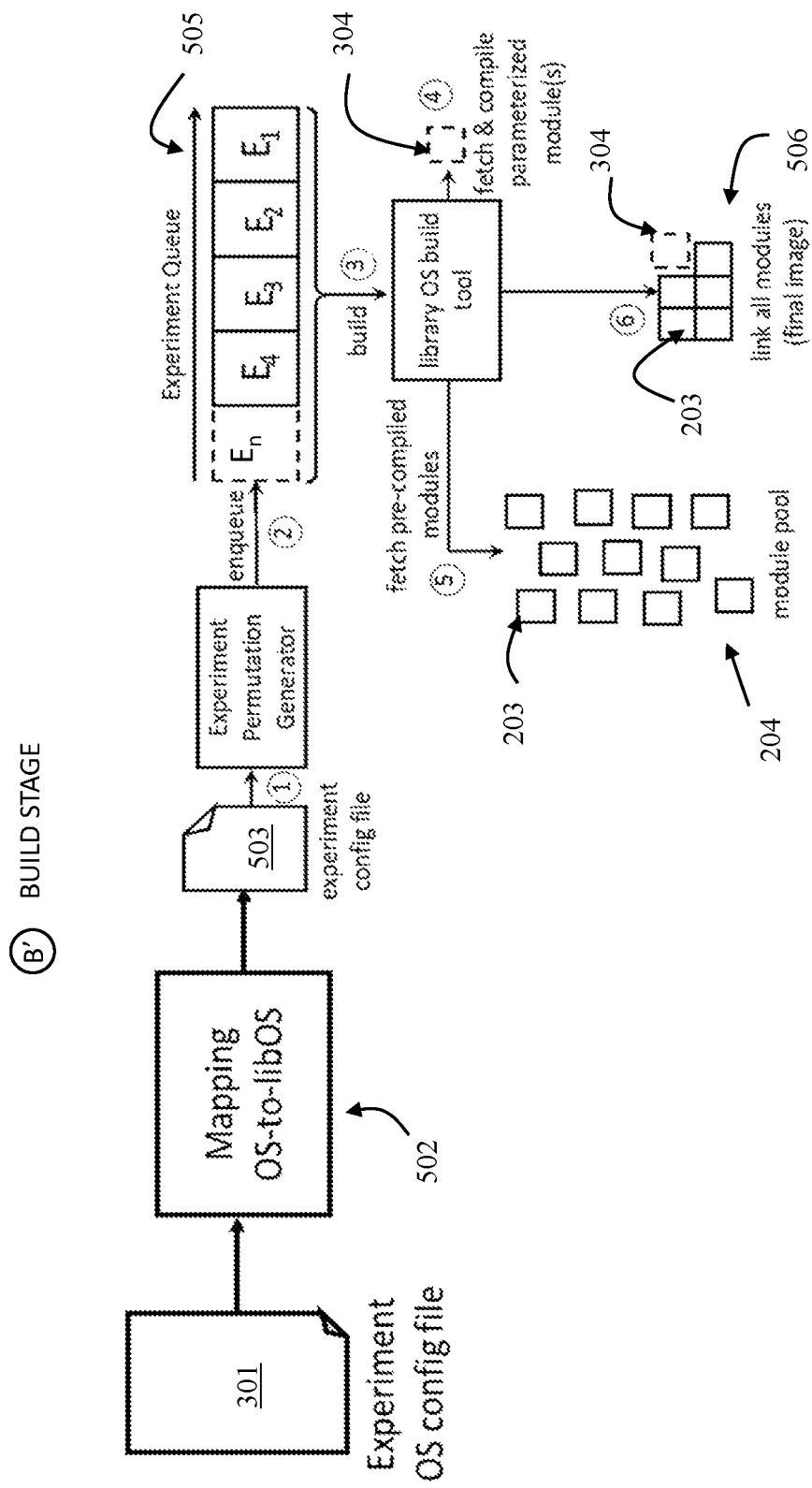
FIG. 5 illustrates an embodiment of the second stage having an OS-to-libOS mapping function.

FIG. 5 illustrates an embodiment of a "build stage" (Stage B') 500 of a method implementing an AIOps mechanism according to the present invention having modifications over what was described above in connection with FIG. 3. For example, compared to what is discussed above, FIG. 5 includes an OS-to-libOS mapping function. That is, in the present embodiment, Stage B' is enhanced with an OS-to-libOS mapping function that maps the configuration space of a target OS to the configurations of the libOS' modules used during testing. Embodiments of the present invention according to FIG. 5 have the advantage that fewer experiments are required to be run, thereby efficiently determining a new OS image.

Similar to the "build stage" (Stage B) 300 illustrated in FIG. 3, FIG. 5 illustrates a "build stage" (Stage B') 500 where a set of experiments varying OS configuration options are used to build different images into order to test their performance.

In "build stage" (Stage B') 500, an experiment OS configuration file 501 is used to specify the parameters and values that should be explored in order to attempt to find a performance optimum. The experiment configuration file 501 specifies system parameters and configurations of the target OS (i.e., a monolithic OS). Accordingly, the experiment configuration file 501 is specified in the configuration space of the target OS.

As shown in FIG. 5, an OS-to-libOS mapping function 502 retrieves the experiment OS config file 501 (Step i). Using the experiment OS config file 501, the OS-to-libOS mapping function 502 maps the system parameters and configurations defined in the experiment OS config file 501 from the configuration space of the target OS to the configuration space of the libOS's modules used during testing, and produces the experiment config file 503 (Step ii). In other words, the OS-to-libOS mapping function 502 converts the experiment OS config file 501 from the configuration space of the target OS to the corresponding experiment config file 503, which is in the configuration space of the relevant library OS used by the library OS build tool 201.

According to an embodiment, an OS-to-libOS mapping function may be defined by an end user, and is specific to the particular application. The OS-to-libOS mapping function is an automated function that includes a mapping protocol, mapping which components in the libOS correspond to which components in the OS. A user may provide a config file (or look-up table) that includes these mappings, and the function may automatically apply the mappings.

Next, an experiment permutation generator 504 receives/retrieves information from the created experiment configuration file 503 (Step 1). The permutation generator 504 then generates a set of "experiments" $E_1, E_2, E_3, E_4, \ldots, E_n$, each specifying the full set of specific configuration options required to build an actual OS image (Step 2). The permutation generator 504 may sequentially generate the set of experiments $E_1, E_2, E_3, E_4, \ldots, E_n$ as an experiment queue 505.

The library OS build tool 201 uses the experiments $E_1, E_2, E_3, E_4, \ldots, E_n$ from the experiment queue 505 to begin building the OS images (Step 3). According to an embodiment, the library OS build tool 201 builds $OS_1, OS_2, OS_3, OS_4, \ldots, OS_n$ respectively from the associated experiments $E_1, E_2, E_3, E_4, \ldots, E_n$ by compiling source code into binary/object files.

Based on the configuration file associated with current experiment $E_n$ in the experiment queue 505, the library OS build tool 201 fetches and compiles any parametrized modules 304 (Step 4). The library OS build tool 201 also fetches all the applicable pre-compiled modules 203 from the module pool 204 (Step 5). Then, the library OS build tool 201 links both the fetched pre-compiled modules 203 and the parametrized modules 304 into a final image 506 (Step 6).

In an embodiment, the graft stage (Stage C') may be implemented to run the experiments only with LibOS modules. Accordingly, the selected configuration can be ported to the target OS using a second mapping function, which maps the libOS module configuration back to the target OS' configuration.

According to an embodiment, second mapping function may be defined by an end user, and is specific to the particular application. The second mapping function is an automated function that includes a mapping protocol, mapping which configuration options in the libOS correspond to which configuration options in the OS. A user may provide a config file (or look-up table) that includes these mappings, and the function may automatically apply the mappings.

The experiments are respectively applied to individually test each final OS image created from the associated configuration file. Based on the testing, an objectively best performing final OS image is determined (e.g., based on a comparison to predefined performance metrics) along with its associated configuration file. This configuration file associated with the best performing OS image is then "selected" and ported to the target OS by mapping back the "selected" configuration to the target OS's configuration.

Figure 6:
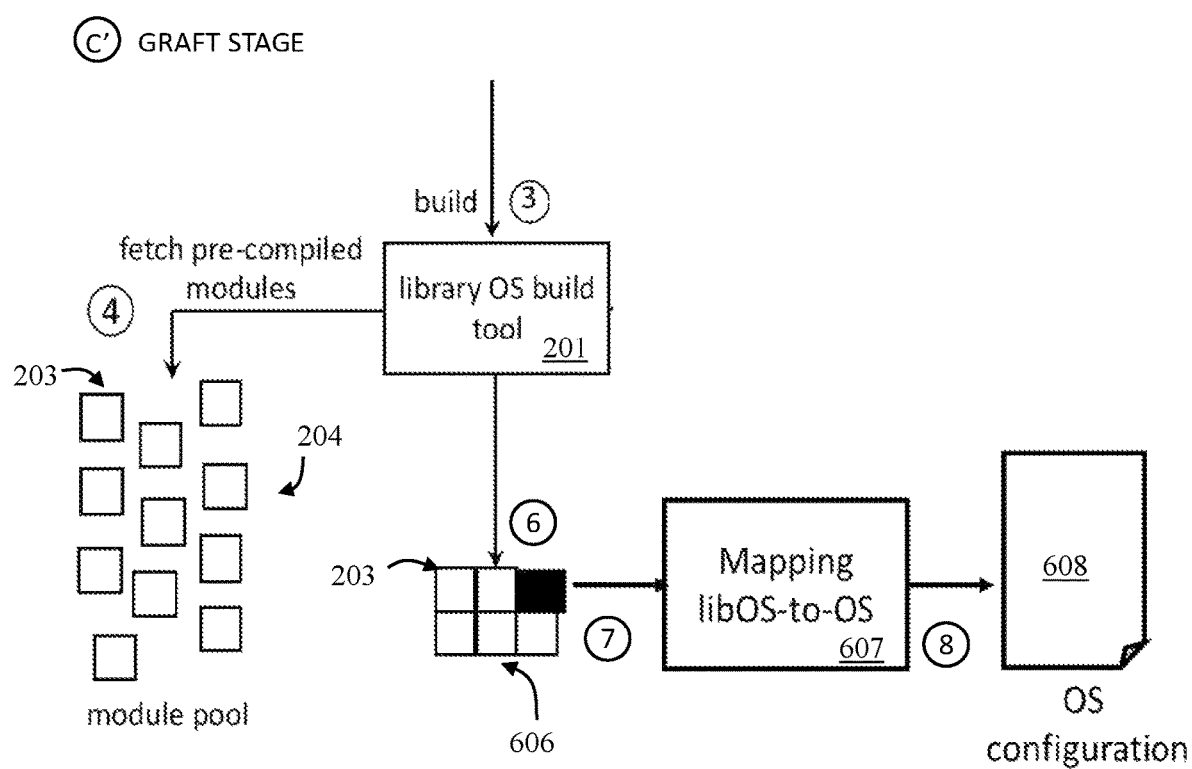
FIG. 6 illustrates an embodiment of the third stage of the method having search-driven configuration space pruning.

FIG. 6 illustrates an embodiment of a "graft stage" (Stage C') 600 of a method implementing an AIOps mechanism according to the present invention using a search-driven configuration space pruning.

Figure 7:
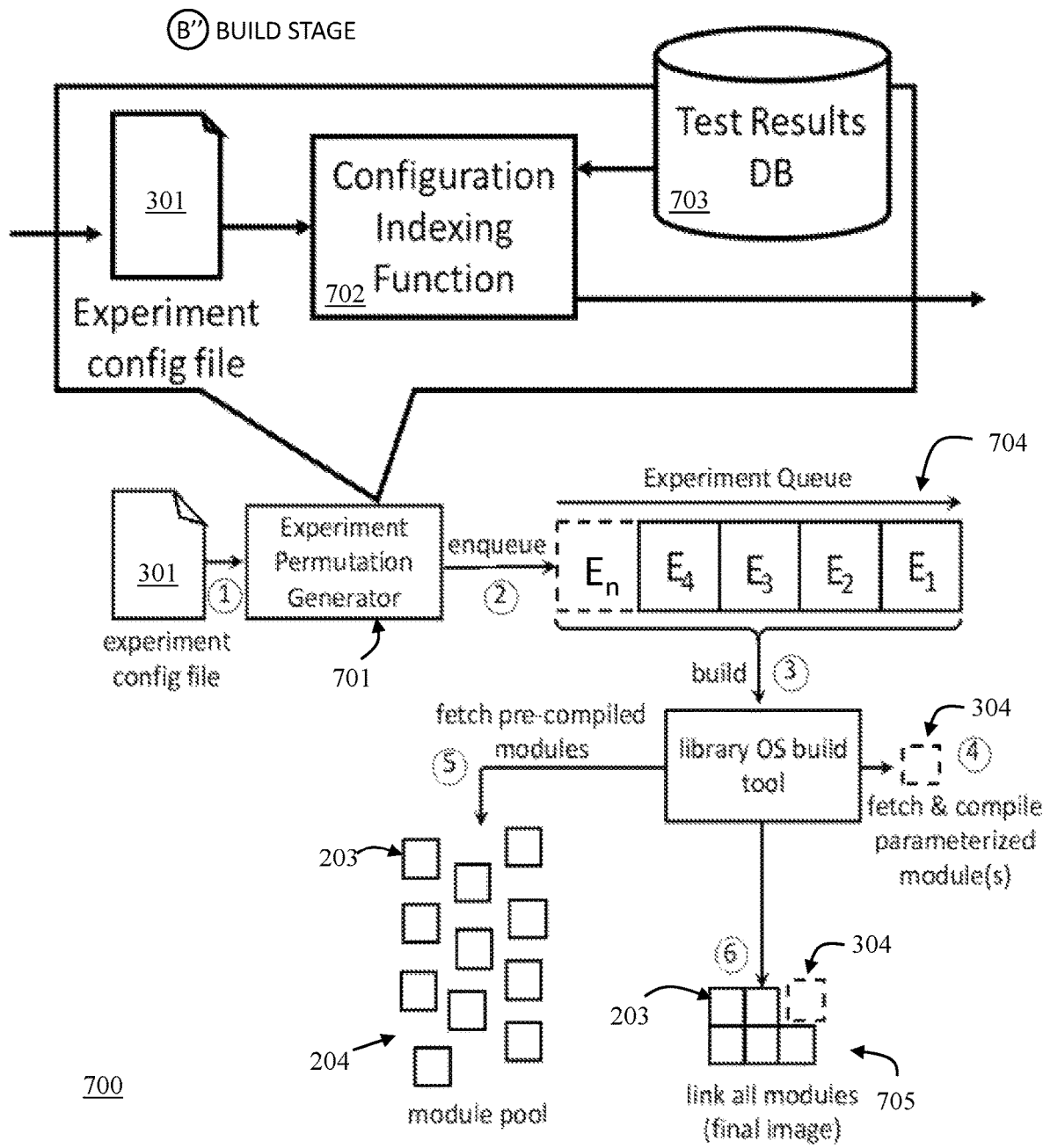
FIG. 7 illustrates an embodiment of the second stage with an experiment permutation generator that is enhanced with a configuration indexing function.

According to an embodiment, the search-driven configuration space pruning may be performed by an experiment permutation generator (see, e.g., the discussion accompanying FIG. 7, including the generation of a hash, querying test results to find select configurations, using the selected configurations to prioritize the experiments, etc.).

In the graft stage (Stage C') 600 the testing of a component of a target OS may be done by using only LibOS modules. To do so, most of the steps in Stage B' previously described are repeated, except that Step 4 of Stage C' is omitted and a new Step 7 is added.

In the graft stage (Stage C') 600 of FIG. 6, the library OS build tool 201 fetches the relevant pre-compiled modules 203 from the module pool 204 based on the current configuration file associated with the current experiment $E_n$ (Step 5). The library OS build tool 201 then links the selected pre-compiled modules 203 to build an OS image 606 (Step 6).

The built OS image 606 can then be tested (e.g., using key performance indicators, described below) for each of the experiments $E_1, E_2, E_3, E_4, \ldots, E_n$ from the experiment queue 505. The best performing OS 606 image can then be determined from among those tested. The target OS configuration may then be 608 may then be determined as described below.

In the graft stage (Stage C') 600 of FIG. 6, an OS image 606 can be ported to the target OS using a libOS-to-OS mapping function 607. In particular, the libOS-to-OS mapping function 607 receives/retrieves the OS image 606 (created using only the libOS modules) and maps the configuration of the OS image 6060 to the target OS configuration 608.

In another embodiment of the present invention, a build stage may include the selection of experiment permutations that includes storing a history of test results and extracting information to guide the selection of future tests.

For example, FIG. 7 illustrates an embodiment of a build stage (Stage B") with an experiment permutation generator that is enhanced with a configuration indexing function.

The build stage (Stage B") of FIG. 7 includes an experiment permutation generator 700 that executes a configuration indexing function 702. The configuration indexing function 702 takes (Step 1) the experiment configuration file 301 and generates a unique hash value that maps the provided experiment to a point in a space of all the possible experiments.

For example, the configuration indexing function 702 may be implemented by a machine learning method that learns a latent representation of the input values in a Euclidean space. Such a mapping function has the property of enabling a clustering of experiment configurations according to their joint similarity. This in turn enables the selection of a cluster of configurations in the neighborhood of the one provided in the configuration file.

A test results data base (DB) 703 is also used by the experiment permutation generator 702. The test results DB 703 stores key performance indicators for any previously tested configuration. The test results DB may be populated continuously. Key performance indicators may be pre-defined according to the application.

According to an embodiment, the experiment permutation generator 701 creates a hash for the provided experiment config file 301.

The hash is used to query the test results DB 703 to extract a set of related configurations. The related configurations are any configuration that has a similarity metric with the given configuration that is above a given threshold. For instance, in the case of a machine learning indexing function that maps configuration to a Euclidean space, the similarity metric may be a Euclidean distance.

The selected set of configurations is used to prioritize the experiments to be run. The prioritization happens by ordering the obtained configurations according to the value of the key performance indicators that are going to be monitored in the experiments.

The prioritized list of configurations to test is used to accordingly queue experiments $E_1, E_2, E_3, E_4, \ldots, E_n$ in the experiment queue 704 (Step 2).

The build stage (Stage B") using this prioritized experiment 704 will then operate the library OS build tool 201 to build an OS image 705 based on a corresponding experiment $E_n$ from the prioritized experiment queue 704. The library OS build tool 201 may operate according to, for example, the method described above in connection with FIG. 3, but the present invention is not so limited.

The OS image 705 may then be tested, and the results of the test may be collected.

After the test is performed and results are collected, the key-performance indicators along with the test configurations are used to update the test results DB 703. This happens using the configuration indexing function 702 to generate a hash of the performed test configuration, and associating to such hash the corresponding test results.

The experiment permutation generator may update (e.g., update periodically or as otherwise controlled) the prioritized experiment queue 704 based on the updates the test results DB 703.

Figure 8A:
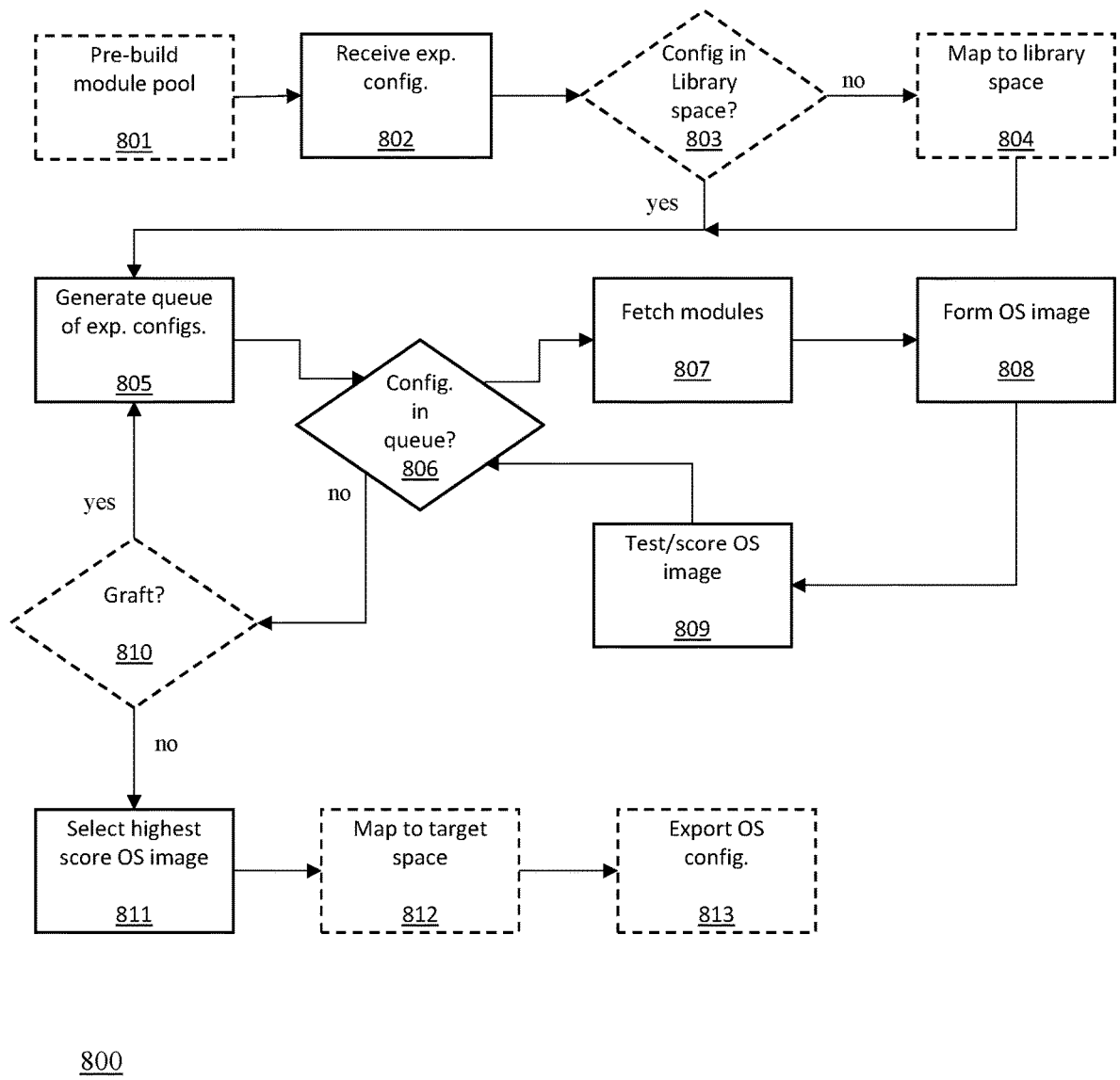
FIG. 8A is a flow diagram showing an embodiment of a method according to the present invention.

FIG. 8A illustrates a flow diagram showing an embodiment of a method 800 according to the present invention.

The method 800 is an accelerated search for performance optima in an operating system configuration option space. The method 800 includes one or more of the following operations. The method 800 is not constricted by a particular order.

Prior to searching for performance optima, the method may include a pre-building operation (Operation 801). In the pre-building operation, the method builds an entire set of modules belonging to a library operating system. The pre-building operation is an optional operation, and may not be performed in every execution of the method 800. For example, the pre-building operation may be performed only one, or after an update has been made to a library operating system.

As part of the method, an experiment configuration file is received (Operation 802). The experiment configuration file specifies parameters and values that are explored in the search for performance optima. The experiment configuration file may be provided by a human operator or may be provided by a machine learning algorithm.

The experiment configuration file is used by an experiment permutation configurator to generate a set of configuration option specifications (Operation 805). In particular, the experiment permutation configuration may generate a queue of experimental configurations for use in building final OS images as part of the search for performance optima.

In some embodiments, the experiment configuration file is modified prior to being used by the experiment permutation configurator. For example, as shown in FIG. 8A, the method 800 includes an optional operation to determine whether the experiment configuration file is provided in a library OS space (Operation 803). If it is determined that the experiment configuration file is in the library OS space, the method 800 continues with passing the original experiment configuration file to the experiment permutation configurator. If however, it is determined that the experiment configuration file is not in the library OS space (e.g., a monolithic OS space), the method may map the received experiment configuration file from the original OS space to the library OS space (Operation 804). The remapped experiment configuration file would then be sent to the experiment permutation configurator.

The OS space determination and OS remapping operations (Operations 803 and 804) are optional, i.e., not all embodiments of the present invention perform one or both of these operations. For example, in one embodiment neither of the OS space determination and OS remapping operations are performed. In this embodiment, the experiment permutation configurator operates on the experiment configuration file in the manner that it is received. In another embodiment, the method expects to receive an experiment configuration file in a non-library OS space and is configured to always map the experiment configuration file to the library space.

Regardless, once the queue of experimental configurations are generated (Operation 805), a loop is entered to build and test OS images based on each experiment configuration in the queue.

The method 800 of FIG. 8A, therefore, includes an operation to determine whether or not there remains an experiment configuration in the queue.

If there is an experiment configuration in the queue, OS modules will be fetched based on the current experiment configuration (Operation 807). The manner of fetching the OS modules will be dependent on the circumstances, and may include one or more of fetching pre-compiled OS modules, and/or fetching and compiled parameterized OS modules.

After all of the OS modules are fetched, a final OS image will be generated (e.g., linked and/or grafted) (Operation 808).

Once the final OS image according to the current experiment configuration is generated, this OS image is testing and scored (Operation 809). The testing and/or scoring may be done according to various methods known by persons of ordinary skill in the art. For example, the testing may include running the obtained software image(s) and measuring their performance for a given metric (e.g., a predetermined key performance criteria). The method may associate a measurement/score with the current experiment configuration, and may save the configuration-score pair.

After testing is complete, the loop continues. That is, the method checks whether there is another experiment configuration in the queue (Operation 806); fetches OS modules according to the updated experiment configuration (Operation 807); forms the OS image with the newly fetched OS modules (Operation 808); and then tests the new OS image (Operation 809). In an embodiment, the testing operation (Operation 809) may be skipped until all of the experimental OS images are formed, and then all of the testing may be completed at once.

Once the experiment configuration que is finished, the method 800 may exit this loop (Operation 806).

In an embodiment, the method 800 performs an (optional and/or alternative) graft stage. Accordingly, if the method determines to perform the graft stage (Operation 810), the above described OS building and testing operations are repeated, however, the fetching operation (Operation 807) includes a grafting modification. An example of such an embodiment is discussed below in connection with FIG. 8C.

According to an embodiment, the method 800 may be automatically determine whether or not to perform the grafting stage according to an input to the method. For example, the experiment configuration file may specific whether or not to perform the grafting stage. Additionally, the method 800 may be configured to only perform the grafting stage. That is, instead of performing the fetch/build/test loop (Operations 807, 808, & 809) without a grafting fetch, the method 800 may be configured to begin with the grafting stage.

While the method 800 illustrates that an operation of generating a queue of experimental configurations is performed after determining whether to enter the grafting stage (Operations 810 and 805), embodiments of the present invention are not so limited. For example, as just described the grafting stage may use the original queue of experimental configurations. Alternatively, the grafting stage may reuse the same queue of experimental configurations.

Regardless, once all experimental OS images are formed and tested, the method 800 determines which of the experimental OS images scored the highest in the tests (Operation 811). Alternatively, the method may output the test scores, and automatically generate a report indicating (for one or more of the experimental configurations) whether the respective combination of configuration options used to build the respective OS image boosted performance (e.g., the tested performance metric).

As described above, the method 800 may (optionally) map a received experiment configuration file from a target OS configuration space to a predefined library OS space. Under this scenario, the method 800 may further include the following operations. After selecting the OS image that scored the highest (Operation 811), the method 800 may map the associated configuration from the library OS configuration to the same OS configuration space of the received experiment configuration file (i.e., the target OS configuration space) (Operation 812). This remapped configuration may be exported as the output of the method (or a new OS image may be built based on the configuration) (Operation 813).

Figure 8B:
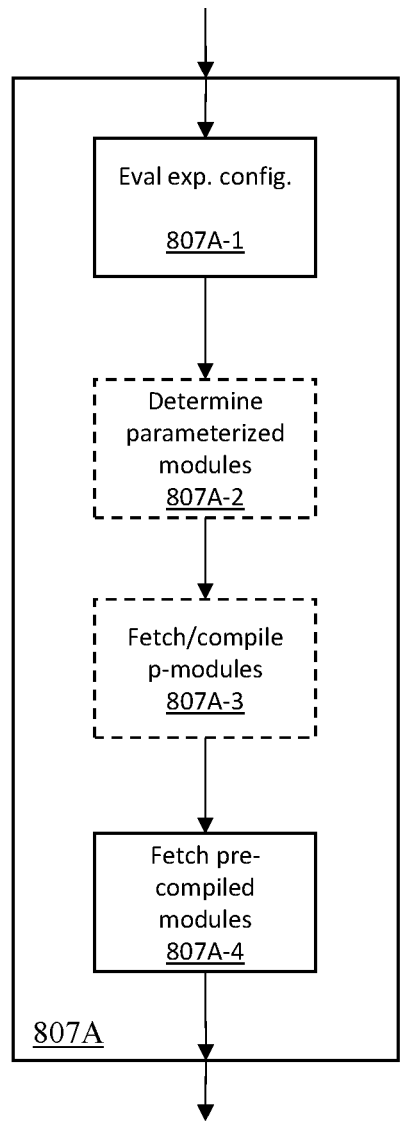
FIGS. 8B and 8C are flow diagrams showing embodiments of a module fetching operation of a method according to the present invention.

FIG. 8B illustrates an embodiment of a fetching operation which may be implemented in the method according to an embodiment of the present invention. In particular, FIG. 8B illustrates a fetching operation 807A that is executed outside of a graft stage (e.g., a build stage).

The fetching operation 807A beings with evaluating a received experimental configuration to determine which OS modules to fetch (807A-1). In an embodiment where only pre-compiled modules are used to generate the final OS image, the fetching operation 807A may only fetch pre-compiled modules (Operation 807A-4). According to an embodiment the method may determine to only fetch pre-compiled modules based on the results of evaluating the current experiment configuration. Alternatively, the method may be preconfigured to only use pre-compiled modules in a present stage of building the OS images.

In another embodiment, the fetching operation 807A may also include fetching and compiling parameterized OS modules. For example, as shown in FIG. 8A, after evaluating the experiment configuration (Operation 807A-1), the fetching operation 807 determines to include fetching parameterized modules (807A-2). Based on such a determination, the fetching operation 807A fetches OS library module(s), and compiles the OS library module(s) based on the relevant parameter (807A-3). The parameter is determined from the experimental configuration. Precompiled modules may also be fetched under this scenario (Operation 807A-4).

Figure 8C:
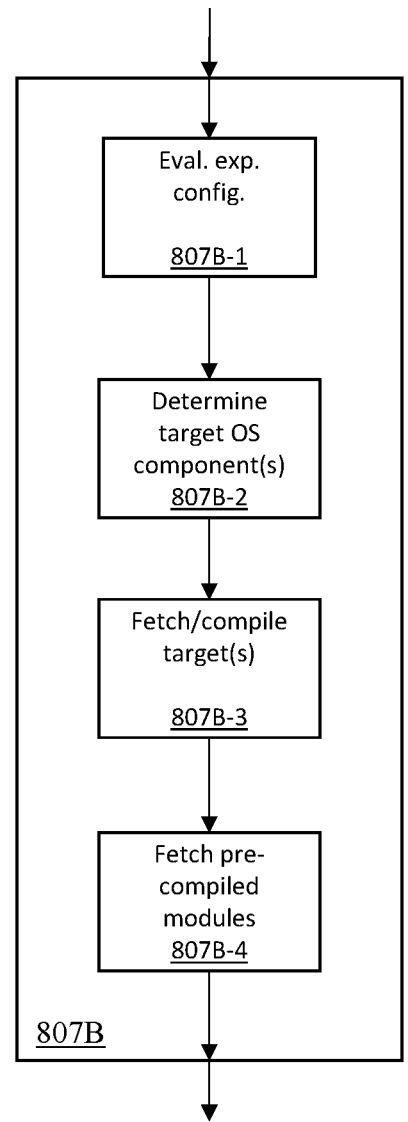

FIG. 8C illustrates an embodiment of a fetching operation which may be implemented in the method according to an embodiment of the present invention. In particular, FIG. 8C illustrates a fetching operation 807B that is executed in a graft stage.

The fetching operation 807B beings with evaluating a received experimental configuration to determine which OS modules to fetch (Operation 807B-1).

The fetching operation 807B of the present embodiment includes a determination to fetch one or more OS components from a target OS image (e.g., a monolithic OS) (Operation 807B-2). The determined OS components are then fetched and compiled from the target OS (Operation 807B-3).

Precompiled modules are also fetched based on the evaluation of the current experimental configuration (Operation 807B-4).

Figure 8D:
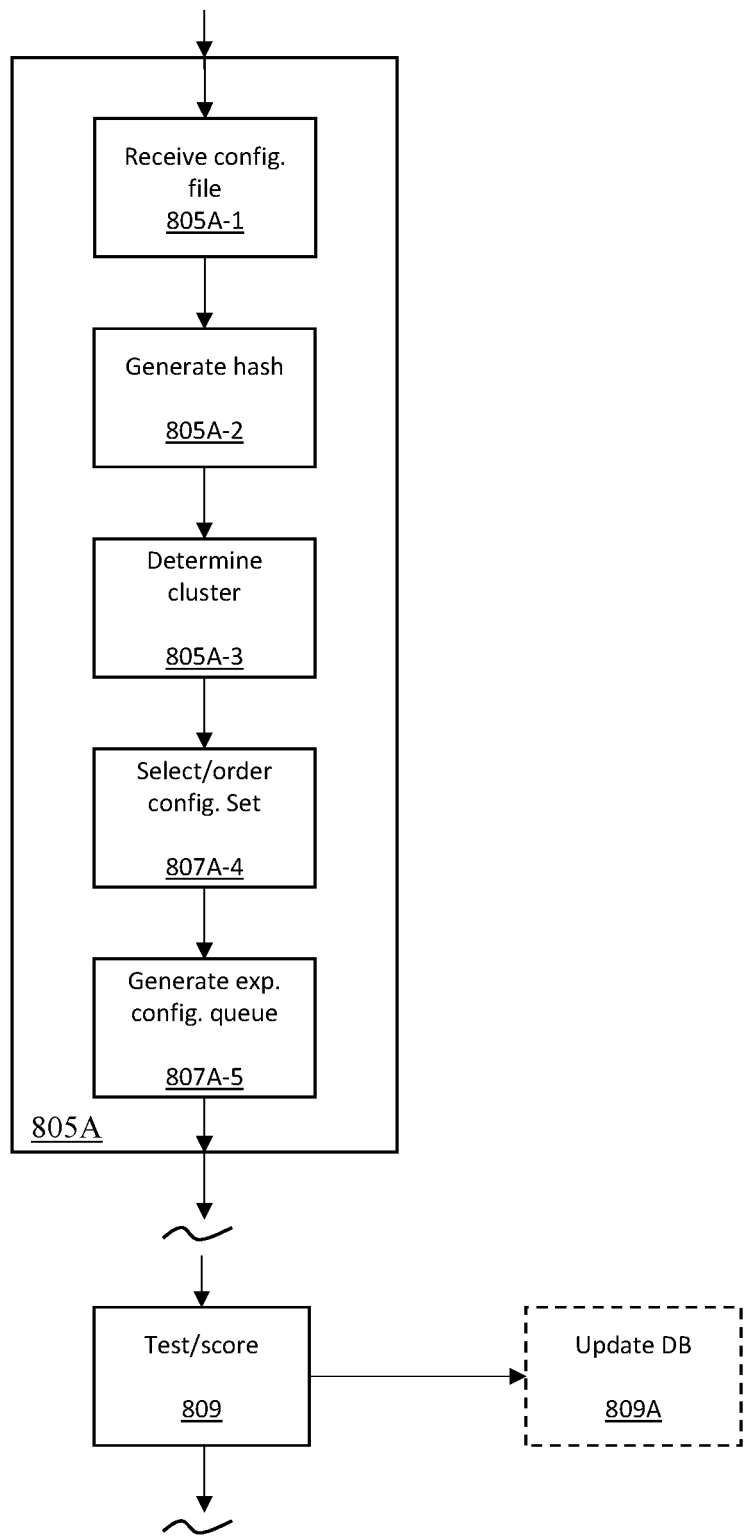
FIG. 8D is a flow diagram showing an embodiment of an experiment configuration generation operation of a method according to the present invention.

FIG. 8D illustrates an embodiment of an experiment configuration generation operation 805A that includes a configuration indexing function.

The experiment configuration generation operation 805A receives a configuration file (805A-1). The configuration file may be created by an operator and/or may be generated based on a predefined target performance metric, goal, configuration, etc. According to a preferred embodiment, the experiment configuration file comprises a set of predefined configuration and parameter options for first experimental OS image for testing. The experiment configuration generation operation 805A may, therefore, generate a plurality of permutations of other configurations and parameters for a plurality of additional OS images for testing.

A unique hash may be generated from the received configuration file (805A-2). The unique hash may map the provided OS configuration (associated with the received configuration file) to a point in a space of all possible experiments. For example, the unique hash may be generated using a machine learning model that learns a latent representation of the provided OS configuration in Euclidean space. Embodiments of the present invention may be implemented with a variety of machine learning models, as would be understood by a person of ordinary skill in the art.

Based on the mapping of the unique hash into the model space, a plurality of additional experiment configurations are determined. For example, the method may determine a cluster of experiment configurations based on their joint similarity (including the similarity to the received configuration (Operation 805A-3).

Information on the additional experiment configurations may be stored in a database (DB). Like the received configuration, the additional experimental configurations may be associated with a latent representation in a Euclidean space. A "cluster" may be identified by a collection of latent representations having a joint similarity metric within a predefined threshold. The similarity metric may be a Euclidean distance. The identified "cluster", therefore, represents additional experimental configurations in the "neighborhood" of the supplied configuration. Accordingly, the present method identifies permutations of the provided OS configuration that have been determined to be sufficiently related to the provided OS configuration.

The database (DB) may also include a performance indicator associated with each of the stored configurations. The performance indicator may be determined based on a prior test result, or may be predicted by the machine learning model.

The provided configuration together with the identified cluster of additional configurations make up the experimental configuration queue. The present method, however, prioritizes the order of the queue based on the performance indicator (Operation 807-A-4). After the experimental configuration are selected and ordered, the experimental configuration que is generated and stored for subsequent operations of the method (Operation 807A-5).

Additionally, a search method implementing a configuration indexing function may include an operation to update a configuration data base. For example, as shown in FIG. 8D, once a test is completed on an OS image configured according to an experimental configuration, the score of the test may be associated with the configuration in the database (DB) (Operation 809A). This database may be continually updated so that future experimental configuration permutations are determined based on the most recent test data.

Figure 9:
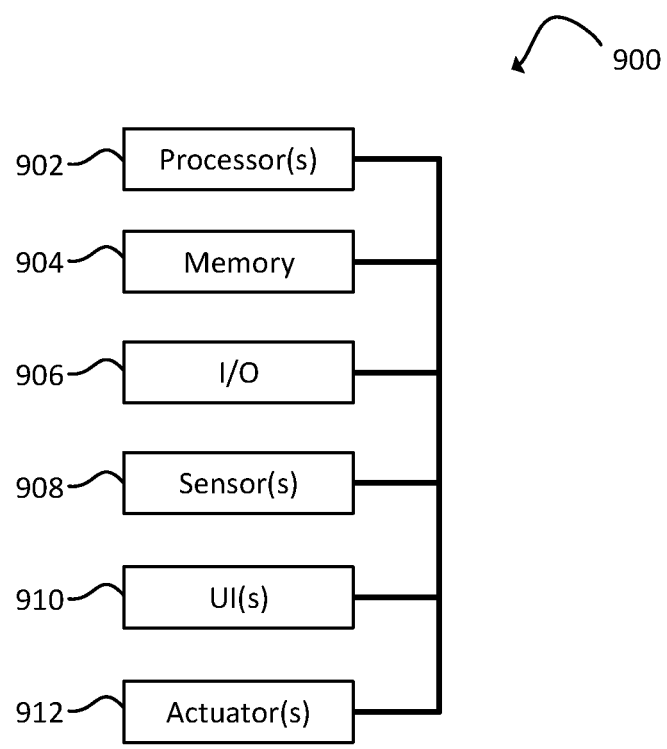
FIG. 9 illustrates a processing system according to an embodiment of the present invention.

Referring to FIG. 9, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 9. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the present invention. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for searching and testing for performance optima in an operating system (OS) configuration space, the method comprising:
   generating a plurality of OS configurations;
   for a first OS configuration of the OS configurations:
   fetching a plurality of OS modules based on the first OS configuration;

building a first OS image from the fetched OS modules; and testing the first OS image to determine a first value of a performance metric;

for each of one or more additional OS configurations of the OS configurations, respectively:
fetching a respective further plurality of OS modules based on a respective one of the additional OS configurations;
building a respective further OS image based on the respective further plurality of OS modules; and
testing the respective further OS image to determine a respective further value of the performance metric;

comparing the first value of the performance metric associated with the first OS image with the respective further value of the performance metric of the respective further OS image associated with each of the one or more additional OS configurations to determine a highest value of the performance metric; and identifying as a selected OS configuration one of the OS configurations from among the first configuration and the one or more additional OS configurations that is associated with the highest value of the performance metric.

2. The method according to claim 1, wherein the test of the first OS image comprises running the first OS image and measuring the first value of the performance metric, the method further comprising outputting the first value of the performance metric associated with the first OS image.

3. The method according to claim 1,
wherein the selected OS configuration is in a library OS space, and
wherein the method further comprises converting the selected OS configuration to a non-library OS space.

4. The method according to claim 1, the method comprising:
receiving an experiment configuration file;
generating the plurality of OS configurations based on the configuration file.

5. The method according to claim 4, wherein the generating the plurality of OS configurations comprises:
generating the first OS configuration according to the experiment configuration file, and
generating further ones of the OS configurations as permutations of the first OS configuration.

6. The method according to claim 4, wherein generating the plurality of OS configurations comprises:
generating a unique hash based on the experiment OS configuration;
determine, from an experiment OS configuration database, a cluster of OS configurations based on calculating a joint similarity among the unique hash and hashes associated with other OS configurations in the experiment OS configuration database.

7. The method according to claim 6,
wherein the experiment OS configuration database comprises performance indicators associated with the hashes, and
wherein the method comprises prioritizing the OS configurations in a queue according to the performance indicators.

8. The method according to claim 1, wherein the plurality of OS modules are fetched only from a pool of precompiled modules of a library OS.

9. The method according to claim 1,
wherein at least one of the plurality of OS modules is fetched from a pool of precompiled modules of a library OS, and
wherein at least another one of the plurality of OS modules is fetched by parametrizing and compiling an uncompiled module of the library OS based on the first OS configuration.

10. The method according to claim 1,
wherein at least one of the plurality of OS modules is fetched from a pool of precompiled modules of a library OS, and
wherein at least another one of the plurality of OS modules is fetched and compiled from a non-library OS.

11. The method according to claim 1, the method comprising:
receiving an experiment OS configuration file comprising target OS configurations in a target OS space;
converting the target OS configurations in the target OS space to library OS configurations in a library OS space; and
generating an experiment configuration file based on the library OS configurations,
wherein the plurality of OS configurations are generated based on the experiment configuration file.

12. A system comprising one or more processors which, alone or in combination, are configured to provide for execution of a method comprising:
generating a plurality of OS configurations;
for a first OS configuration of the OS configurations:
fetching a plurality of OS modules based on the first OS configuration;
building a first OS image from the fetched OS modules; and
testing the first OS image to determine a first value of a performance metric;
for each of one or more additional OS configurations of the OS configurations, respectively:
fetching a respective further plurality of OS modules based on a respective one of the additional OS configurations;
building a respective further OS image based on the respective further plurality of OS modules; and
testing the respective further OS image to determine a respective further value of the performance metric;
comparing the first value of the performance metric associated with the first OS image with the respective further value of the performance metric of the respective further OS image associated with each of the one or more additional OS configurations to determine a highest value of the performance metric; and
identifying as a selected OS configuration one of the OS configurations from among the first configuration and the one or more additional OS configurations that is associated with the highest value of the performance metric.

13. A tangible, non-transitory computer-readable medium having instructions thereon which, upon being executed by one or more processors, alone or in combination, provide for execution of the method of claim 1.

14. A method for searching and testing for performance optima in an operating system (OS) configuration space, the method comprising:
receiving an experiment configuration file;
generating a plurality of OS configurations based on the configuration file;

for a first OS configuration of the OS configurations:
   fetching a plurality of OS modules based on the first OS configuration;
   building a first OS image from the fetched OS modules; and
   testing the first OS image to determine a first value of a performance metric;
wherein generating the plurality of OS configurations comprises:
   generating a unique hash based on the experiment OS configuration; and
   determining, from an experiment OS configuration database, a cluster of OS configurations based on calculating a joint similarity among the unique hash and hashes associated with other OS configurations in the experiment OS configuration database;
wherein the experiment OS configuration database comprises performance indicators associated with the hashes, and
wherein the method further comprises prioritizing the OS configurations in a queue according to the performance indicators.

* * * * *